United States Patent [19]

Kennedy et al.

[11] Patent Number: 4,732,312

[45] Date of Patent: Mar. 22, 1988

[54] METHOD FOR DIFFUSION BONDING OF ALLOYS HAVING LOW SOLUBILITY OXIDES

[75] Inventors: James R. Kennedy, Huntington; Edmund Y. Ting, Oyster Bay, both of N.Y.

[73] Assignee: Grumman Aerospace Corporation, Bethpage, N.Y.

[21] Appl. No.: 928,898

[22] Filed: Nov. 10, 1986

[51] Int. Cl.$^4$ ................... B23K 20/22; B23K 20/24
[52] U.S. Cl. ................... 228/157; 228/193; 228/203; 228/205; 228/263.17; 228/172; 148/11.5 A
[58] Field of Search ............... 228/157, 193, 118, 265, 228/172, 205, 263.17, 203; 148/11.5 A

[56] References Cited

U.S. PATENT DOCUMENTS

| | | | |
|---|---|---|---|
| 3,041,718 | 7/1962 | Stuchbery | 228/115 |
| 3,180,022 | 4/1965 | Briggs et al. | 228/194 |
| 3,500,532 | 3/1970 | Lozano et al. | 228/115 |
| 3,552,898 | 1/1971 | Bird . | |
| 3,657,801 | 4/1972 | Hershenson | 228/194 |
| 3,680,197 | 8/1972 | Blum et al. . | |
| 3,758,741 | 9/1973 | Holko et al. . | |
| 3,815,219 | 6/1974 | Wilson . | |
| 3,920,175 | 11/1975 | Hamilton et al. | 228/193 |
| 3,927,817 | 12/1975 | Hamilton et al. | 228/193 |
| 3,937,387 | 2/1976 | Fletcher et al. | 228/193 |
| 4,025,036 | 5/1977 | Melnyk | 228/193 |
| 4,087,037 | 5/1978 | Schier et al. | 228/193 |
| 4,117,970 | 10/1978 | Hamilton et al. | 228/193 |
| 4,197,978 | 4/1980 | Kasper | 228/193 |
| 4,220,276 | 9/1980 | Weisert et al. | 228/118 |
| 4,331,284 | 5/1982 | Schulz et al. | 228/193 |
| 4,361,262 | 11/1982 | Israeli | 228/118 |
| 4,452,389 | 6/1984 | Amin . | |
| 4,483,478 | 11/1984 | Schultz | 228/157 |
| 4,499,156 | 2/1985 | Smith et al. | 228/124 |

FOREIGN PATENT DOCUMENTS

| | | | |
|---|---|---|---|
| 66846 | 6/1978 | Japan | 228/193 |
| 585937 | 12/1977 | U.S.S.R. | 228/193 |
| 287069 | 1/1978 | U.S.S.R. . | |
| 1151404 | 4/1985 | U.S.S.R. | 228/193 |

OTHER PUBLICATIONS

"A Review of Diffusion Welding", Gerken and Owczarski, Welding Research Council, Bulletin, 10/65.
R. R. Irving, "Amorphous Metals: The New Metallurgy", Iron Age, May 11, 1983, pp. 47 to 52.
H. Jones, "The Status of Rapid Solidification of Alloys in Research and Application", Journal of Materials Science, 1984, pp. 1043, 1044.
T. D. Byun and P. Yavari, "The Joining of Superplastic Aluminum for Aircraft Structural Applications", Proceedings of Int. Conf. Jul. 1985, pp. 285 to 294.
D. V. Dunford and P. G. Partridge, "Shear and Peel Strengths of Diffusion Bonded Al-Alloys", Int. Conf. Jul. 1985, pp. 4 to 8, plus following 16 pages.
J. Pilling and N. Ridley, "Solid State Bonding of Superplastic AA7475", Materials Science and Technology, May 1987, vol. 3, pp. 353 to 358.

Primary Examiner—Nicholas P. Godici
Assistant Examiner—Samuel M. Heinrich
Attorney, Agent, or Firm—Richard G. Geib; Daniel J. Tick; David Aker

[57] ABSTRACT

Diffusion bonding of surface layers of an alloy, such as an aluminum alloy, having surface oxides of low solubility in the alloy includes treating the surface layers to be bonded to remove existing surface oxide coatings, and diffusion bonding the surface layers to one another by placing the alloy to be bonded under sufficient pressure to cause disruption of the oxide coatings by localized surface deformation of the alloy, enhanced by a superplastic microstructure, without substantial deformation of the alloy, i.e., macroscopic deformation approaching zero percent, while heating the alloy in a non-oxidizing atmosphere for a time sufficient for diffusion bonding to occur. The alloy may be treated so that at least the surface layers thereof have a fine grain structure of the type associated with superplastic forming properties. Components may be formed by diffusion bonding and superplastic forming.

27 Claims, 18 Drawing Figures

FIG. 2

| HEAT TREAT CONDITION | YIELD STRENGTH 0.2% (ksi) | ULTIMATE STRENGTH (ksi) | ELONGATION, 12.5 mm GAGE (%) | SHEAR STRENGTH (ksi) |
|---|---|---|---|---|
| AS-RECEIVED, WE6 | 64.0 ± 0.5 | 87.3 ± 0.6 | 22.0 ± 1.6 | 44.3 ± 1.6 |
| AGED, T6 | 76.5 ± 0.6 | 86.4 ± 0.5 | 20.0 ± 0.9 | 51.4 ± 0.6 |
| AGED, T61 | 66.0 | 75.0 | 9.0 ** | 45.0 |
| 516° C/2h* + T6 | -- | -- | -- | 52.4 ± 0.6 |
| 516° C/4h* + T6 | -- | -- | -- | 48.2 ± 0.9 |
| 516 C/4h* + T6 | -- | -- | -- | 46.6 ± 0.8 (E) |
| OVERAGED, T73 | 71.6 ± 0.5 | 79.0 ± 0.5 | 16.3 ± 0.2 | 48.6 ± 0.9 |
| 516° C/4h* + T73 | -- | -- | -- | 48.8 ± 0.7 |
| 516° C/2h* | -- | -- | -- | 25.1 ± 0.5 |
| 516° C/4h* | -- | -- | -- | 25.1 ± 1.3 |
| 516° C/4h* | -- | -- | -- | 22.6 ± 0.2 (E) |
| ANNEALED, -O | *** | *** | *** | 22.0 |

\* DIFFUSION BONDING THERMAL TREATMENT
\*\* ELONGATION, 25 mm GAGE
\*\*\* ANNEALED PROPERTIES FOR 7475-O NOT REPORTED; USED SHEAR STRENGTH FOR 7075-O
(E) = SCHEDULE E MATERIAL; OTHERWISE SCHEDULE B MATERIAL IS REPORTED

FIG. 3

| BONDING PRESSURE (PSIA) | BONDING TIME (MIN) | SHEAR STRENGTH (ksi) | FAILURE LOCATION ** | OVERALL AVERAGE SHEAR STRENGTH (ksi) |
|---|---|---|---|---|
| 15 | 5 | 13.5 ± 1.3 (3)* | DBI | 13.5 ± 1.3 |
|  | 15 | 12.0 (1) | DBI | 12.0 |
|  | 30 | 14.3 ± 1.4 (3) | DBI | 14.3 ± 1.4 |
|  | 60 | 13.1 ± 3.7 (4) / 14.9 ± 1.7 (3) | DBI / DBI | 14.0 ± 3.0 |
|  | 120 | 13.0 (1) / 12.2 ± 3.2 (2) / 21.8 ± 0.8 (3) | DBI / DBI / DBI | 16.8 ± 4.8 |
|  | 240 | 25.4 ± 0.5 (2) / 26.0 ± 3.4 (4) / 34.0 ± 1.9 (2) / 35.8 ± 1.0 (3) | DBI / DBI / DBI / DBI | 30.0 ± 5.1 |
|  | 3780 (63h) | 38.8 ± 0.5 (3) | DBI | 38.8 ± 0.5 |
| 50 | 60 | 23.1 ± 0.8 (2) / 32.2 ± 1.5 (4) | DBI / DBI | 29.2 ± 5.0 |
|  | 120 | 28.2 ± 3.4 (3) | DBI | 28.2 ± 3.4 |
|  | 240 | 40.4 ± 0.9 (4) / 40.2 ± 2.0 (2) / 37.9 ± 0 (2) / 40.4 ± 0.4 (4) / 38.8 ± 0.3 (4) | BM-50% / BM / DBI / BM / BM | 39.7 ± 1.3 |
| 100 | 60 | 33.9 ± 2.2 (2) | DBI | 33.9 ± 2.2 |
|  | 120 | 37.2 ± 0.4 (3) / 39.2 ± 0.3 (4) | DBI / DBI | 38.8 ± 1.4 |
|  | 240 | 44.6 ± 1.8 (5) / 36.8 ± 0.4 (3) | BM-50% / DBI | 41.7 ± 4.0 |
|  | 240 | 47.9 ± 3.0 (12)(E) / 46.6 ± 0.8 (4)(E) | DBI / DBI | 47.5 ± 2.7 (E) |

* NUMBER OF TESTS INDICATED IN PARENTHESES
** DBI = DIFFUSION BOND INTERFACE, BM = BASE METAL
(E) = DATA FOR SCHEDULE E MATERIAL; OTHERWISE SCHEDULE B MATERIAL IS REPORTED

*FIG. 4*

| BONDING TEMPERATURE, °C | BONDING TIME, h | BONDING*** PRESSURE, psi | BONDING SHEAR STRENGTH, ksi**** | |
|---|---|---|---|---|
|  |  |  | As-DIFFUSION BONDED | T6 TEMPER |
| 516 | 4 | 5 | 22.6 ± 0.5 | 35.8 ± 1.0 |
|  |  | 250 | 20.0 ± 0.5 | 29.4 ± 2.4 |
|  |  | 500 | 20.0 ± 0.3 | 20.1 ± 1.6 |
|  | 15 | 15 | 12.5 ± 1.4** | 7.8 ① ** |
|  |  | 250 | 22.2 ± 0.2 | 37.0 ± 2.6 |
|  |  | 500 | 17.5 ± 1.9 | 20.4 ± 2.7 ② |
|  | 63 | 15 | 24.4 ± 1.0 | 38.8 ± 0.5 |
| 460 | 4 | 15 | 5.4 ± 2.2 | 3.7 ① |
|  |  | 250 | 12.6 ① | * |
|  |  | 500 | 25.6 ± 0.1 | 39.1 ± 2.2 |
|  | 15 | 15 | 5.4 ① | 0 |
|  |  | 500 | 22.8 ± 0.3 | 32.8 ± 2.3 |
|  | 63 | 500 | 23.0 ± 0.6 | 36.8 ± 0.7 |

* THIS CONDITION NOT TESTED
** THIS SPECIMEN KNOWN TO BE CONTAMINATED DURING DIFFUSION BONDING
*** THE "VACUUM SIDE" PRESSURE OF THE BONDING FIXTURE WAS 20μm. SURFACE TREATMENT FOR ALL SPECIMENS: SiC GRIND + ACID + BRUSH.
**** ALL FAILURES OCCURRED AT DIFFUSION BOND INTERFACE. SHEAR STRENGTH IS AVERAGE OF THE THREE TESTS, EXCEPT WHERE NOTED ①. NUMBER IN CIRCLE: ACTUAL NUMBER TESTED

| MATERIAL CONDITION | RECRYSTALLIZATION HEATING RATE, (K s⁻¹) | GRAIN SIZE* | | BOND SHEAR*** STRENGTH (ksi) |
|---|---|---|---|---|
| | | $d_{ST}$ (μm) | $d_L$ (μm) | |
| PLATE, AS-RECEIVED (T61) | — | 38 ± 6 | 285 ± 130 | 18.7 ± 3.0 |
| PLATE, AS-RECEIVED (T61) | — | 29 ± 14 | 112 ± 60 | 29.4 ± 4.0 |
| PLATE, AS-ROLLED | 0.22** (AIR FURNACE) | 12 ± 1** | 31 ± 5** | 36.0 ± 1.4 |
| PLATE, TMP-1 | 0.27 (AIR FURNACE) | 16 ± 3 | 32 ± 10 | 38.7 ± 1.6 |
| PLATE, TMP-2 | 5.24 (AIR FURNACE) | 14 ± 2 | 26 ± 3 | 32.8 ± 4.6 |
| PLATE, TMP-3 | 12.20 (SALT BATH) | 9 ± 1 | 15 ± 4 | 47.5 ± 1.7 |
| SHEET, ALCOA SCHEDULE E | — | 9 ± 1 | 16 ± 5 | 47.9 ± 3.0 |

* SHORT TRANSVERSE GRAIN SIZE, $d_{ST}$; LONGITUDINAL GRAIN SIZE, $d_L$; MEASURED BEFORE BONDING
** RECRYSTALLIZATION DURING DIFFUSION BONDING, GRAIN SIZE MEASURED AFTER BONDING
*** DIFFUSION BONDED AFTER TMP TREATMENTS; TESTED IN T6 CONDITION

| SURFACE TREATMENT (SiC GRIT SIZE) | SURFACE ROUGHNESS (μ in, RHR*) | | SHEAR STRENGTH** (ksi) |
|---|---|---|---|
| | PARALLEL | PERPENDICULAR | |
| 120 | 13.3 | 25.8 | — |
| 120 + BRUSH | 15.8 | 23.3 | 28.8 ± 3.3 |
| 180 | 15.7 | 23.2 | — |
| 180 + BRUSH | 11.0 | 20.6 | 27.8 ± 0.5 |
| 320 | 11.3 | 21.0 | — |
| 320 + BRUSH | 13.8 | 13.3 | 29.6 ± 0.6 |
| 400 | 4.2 | 14.3 | — |
| 400 + BRUSH | 13.8 | 13.3 | 31.2 ± 2.6 |
| 600 | 4.3 | 6.7 | — |
| 600 + BRUSH | 9.7 | 8.5 | 28.2 ± 3.4 |

* ROUGHNESS HEIGHT RATING, MEASURED ON Ra SCALE OF PERTHOMETER PROFILOMETER (RHR × 1.1 ≈ RMS)
** BONDED AT 516°C/50 PSIA/2h

| BONDING TIME (h) | BONDING PRESSURE (psia) | PRE-BOND AIR EXPOSURE TIME* (h) | SHEAR STRENGTH (ksi) |
|---|---|---|---|
| 2 | 50 | < 0.25 | 28.2 ± 3.4 |
| | | 2 | 24.9 ± 5.4 |
| | | 4 | 16.6 ± 1.5 |
| | | 16 | 29.2 ± 0.6 |
| | | 48 | 32.0 ± 2.1 |
| | | | 27.1 ± 8.5 |
| 4 | 15 | < 0.25 | 30.0 ± 5.1 |
| | | 24 | 27.4 ± 0.3 |
| | | 48 | DID NOT BOND |

* TIME AFTER STANDARD PREPARATION

| SURFACE TREATMENT | BONDING TIME, h | VACUUM-SIDE PRESSURE, μm | BOND SHEAR STRENGTH, ksi* (FAILURE LOCATION) As-DB | (FAILURE LOCATION) T6 | COMMENTS |
|---|---|---|---|---|---|
| 1. SiC GRIND + ACID ETCH | 3 | 150 | 4.9 ± 0.8 (DBI) | — | — |
|  | 4 | 150 | 1.6 ± 0.4 (DBI) | — | 3 SPEC. BROKE DURING H.T. |
|  | 15 | 150 | 2.8 ± 0.1 (DBI) | 7.5① (DBI) | 2 SPEC. BROKE DURING H.T. |
| 2. SiC GRIND + ACID + STAINLESS STEEL BRUSH | 4 | 150 | 7.8 ± 0.1 (DBI) | 18.2② (DBI)* |  |
|  | 4 | 20 | 18.2 ± 1.1 (DBI) |  |  |
|  | 15 | 150 | 18.0 ± 3.0 (BM) |  |  |
|  | 15 | 20 | 18.4 ± 0.2 (BM) | 23.9 ± 0.4 (DBI) |  |
|  | 63 | 150 | 15.4 ± 1.0 (BM) | * |  |
| 3. ACETONE + STAINLESS STEEL BRUSH | 4 | 150 | 8.7① (DBI) | 21.8 ± 0.8 (DBI) |  |
|  | 4 | 20 | 13.9 ± 2.4 (DBI) | 10.1 ± 1.9 (DBI) |  |
|  | 15 | 20 | 17.5 ± 1.0 (BM) | 5.1① (DBI) |  |
|  | 63 | 20 | 19.1 ± 0.5 (DBI) | 28.0 ± 1.0 (DBI) |  |
| 4. SiC GRIND + ALKALINE ETCH | 15 | 150 | 0 | 0 | NO BONDING |
| 5. SiC GRIND + ALKALINE ETCH + STAINLESS STEEL BRUSH | 4 | 150 | 7.0 ± 1.0 (DBI) | 19.1 ± 1.9 (DBI) |  |

\* THIS CONDITION NOT TESTED
\*\* BONDING TEMPERATURE = 460°C, BONDING PRESSURE = 500 psi
{AS-DB (AS-DIFFUSION BONDED); T6 (HEAT TREATED TO T6 TEMPER)
\*\*\* SHEAR STRENGTH IS AVERAGE OF THREE TESTS, EXCEPT WHERE NOTED. ①: NUMBER IN CIRCLE: ACTUAL NUMBER TESTED.
DBI = DIFFUSION BOND INTERFACE; BM = BASE METAL

FIG. 16

| HEAT TREAT CONDITION | SHEAR STRENGTH, ksi | |
|---|---|---|
|  | 7075 | 7475 |
| ANNEALED-0 | 22 | 22 (1) |
| AGED, T6 | 48 | 45 |

(1) NOT AVAILABLE FOR 7475, THEREFORE USED VALUE FOR 7075

FIG. 17

| SURFACE TREATMENT | SURFACE ROUGHNESS, μin (RHR)* | |
|---|---|---|
|  | PARALLEL | PERPENDICULAR |
| 1. AS-RECEIVED | 9.8 ± 0.3 | 13.7 ± 0.9 |
| 2. SiC GRIND + ACID ETCH | 11.0 ± 1.3 | 11.7 ± 0.9 |
| 3. SiC GRIND + ACID ETCH + BRUSH | 10.3 ± 0.9 | 13.1 ± 1 |
| 4. BRUSH | 17.0 ± 1.9 | 23.9 ± 5.2 |
| 5. SiC GRIND + ALKALINE ETCH + BRUSH | 9.2 ± 0.8 | 13.0 ± 0.2 |

\*ROUGHNESS HEIGHT RATING, MEASURED ON Ra SCALE OF PERTHOMETER PROFILOMETER

METHOD FOR DIFFUSION BONDING OF ALLOYS HAVING LOW SOLUBILITY OXIDES

BACKGROUND OF THE INVENTION

The invention relates to diffusion bonding. More particularly, the invention relates to the diffusion bonding of alloys having oxides which are of low solubility in their respective alloys. Further, the invention relates to the diffusion bonding of such alloys when at least the surfaces to be bonded may have the fine grain structure associated with superplastic forming properties.

The combined use of superplastic forming and diffusion bonding (SPF/DB) offers the potential to manufacture lighter and less expensive aircraft structures than those made by conventional means. It is particularly attractive for sheet metal structures because part and fastener counts could be reduced, thereby significantly decreasing assembly labor. Also the fabrication of structures to near-net shapes using SPF/DB technology can improve material utilization and reduce machining time and costs.

The application of SPF/DB to titanium alloys has been well demonstrated but this is not the case for advanced high strength aluminum alloys. Although impressive SPF behavior has already been demonstrated for aluminum alloys, such as 7475, and work has begun on developing superplastic properties for Al-Li alloys, the diffusion bonding technology for these materials is lagging. A simple and cost-effective diffusion bonding technique compatible with SPF technology could significantly advance the use of aluminum structures.

In diffusion bonding, flattening of the abutting surfaces is necessary in order to achieve intimate interfacial contact. Metals like titanium, which have surface oxides that easily dissolve in the metal during heating, can be readily diffusion bonded without the use of special surface preparations or interlayer diffusion aids. Unlike titanium, aluminum and its alloys (as well as, for example, zirconium and vanadium and their respective alloys) form insoluble oxides which do not readily dissolve during bonding and thus act as barriers to intimate metal-to-metal contact and subsequent diffusion.

Typically, aluminum has been diffusion bonded by methods which rely upon considerable deformation (up to 60%) and pressure (up to 40,000 psi) to rupture surface oxide barrier films or by methods which use interlayer materials to dissolve oxides and aid diffusion. In general, such methods are not compatible with the constraints imposed by SPF technology or the mechanical property requirements of a high performance structure.

For example, practical limitations set by production equipment dictate that SPF pressures probably should be limited to 1000 psi and perhaps should be much lower. In addition, other variables important to SPF, such as starting microstructure, dwell time, forming rate, dynamic recrystallization, and post heat treatment must be considered.

Aluminum has also been diffusion bonded by removing the surface oxide layers by sputtering or other suitable techniques in a hard vacuum or reduced pressure inert gas environment in order to prevent the oxide layer from being formed again before bonding. However, pressures below $10^{-9}$ Torr must be maintained in order to keep the oxide layer from forming again almost instantly in a hard vacuum and pressures of approximately $10^{-6}$ Torr in an inert gas environment are desirable. In other words, using these techniques, the cleaned surfaces can not be exposed to air prior to bonding. It is generally believed that cleaning techniques such as abrading, chemical etching or dissolving the oxide by the use of fluxes, if carried out in a vacuum or low pressure inert gas environment, to preserve the oxide cleaned surface, present problems in controlling removal of oxides from the work, etching solutions or the process chamber.

It is the principal object of the invention to provide a method for diffusion bonding alloys having oxides of low solubility.

It is another object of the invention to provide a method for diffusion bonding aluminum alloys wherein at least the surface layers have the grain structure associated with superplastic forming.

It is still another object of the invention to provide a method of diffusion bonding useful for components having superplastic properties.

It is a further object of the invention to provide a method for diffusion bonding alloys having oxides of low solubility wherein relatively simple and inexpensive surface preparation procedures can be used.

It is yet another object of the invention to provide a method of diffusion bonding wherein after surface preparation procedures are completed, the surfaces prepared have a reasonable shelf life, in air at room temperature, during which diffusion bonding may be successfully performed.

It is still another object of the invention to provide a method of diffusion bonding which requires the use of relatively low pressures to force surfaces to be bonded together.

It is a further object of the invention to provide a method of surface preparation for alloys having oxides of low solubility which is conducive to diffusion bonding.

SUMMMARY OF THE INVENTION

In accordance with the invention diffusion bonding of surface layers of an alloy having surface oxide coatings of low solubility in the alloy comprises the steps of treating the surface layers to be bonded to remove existing surface oxide coatings, and diffusion bonding the surface layers to one another by placing the alloy to be bonded under sufficient pressure to cause disruption of the oxide coatings without substantial deformation of the alloy, while heating the alloy in a nonoxidizing atmosphere for a time sufficient for diffusion bonding to occur. Generally, the deformation will approach zero percent or a very low amount on a macroscopic scale. Pressures of less than 1000 psia and preferably less than 100 psia may be applied to force the surfaces together. The diffusion bonding generally takes place at temperatures below the melting point of the alloy at the superplastic forming temperature for a time ranging between one and ten hours. At least one part of the diffusion bonded assembly may be superplastically formed to produce a structurally useful component of a predetermined configuration.

The method may also comprise the step of treating the alloy so that the alloy, or at least the surface layers thereof, have a fine grain structure of the type associated with superplastic forming properties. Enhanced localized surface deformation of such alloys resulting from the superplastic microstructure leads to extensive oxide film disruption, thus facilitating bonding. The fine grain surface structure may also be produced by localized mechanical surface deformation and heating of the alloy to cause recrystallization or by repeated mechanical deformation and heating.

After diffusion bonding (and superplastic forming) the bonded structure may be further heat treated by solution treating, quenching and aging.

The surfaces to be bonded are prepared by abrading with successively finer grades of grinding paper, rinsing with water, abrading with a metallic brush, and removing the brushings. The abrading may be performed by abrading in a first direction, and abrading in a second direction substantially at right angles to the first direction. The brushings may be removed by exposing the surfaces to a stream of filtered compressed air moving at a velocity sufficiently high to remove the brushings.

Pressure may be applied to the components to be bonded by forcing the surfaces together by placing the components in a fixture, exposing a first opposite surface to a first surface layer to be diffusion bonded to one of a partial vacuum and a pressurized gas and exposing a second opposite surface to a second surface layer to be diffusion bonded to another of said partial vacuum and pressurized gas.

BRIEF DESCRIPTION OF THE DRAWINGS

In order that the invention may be readily carried into effect, it will now be described with reference to the accompanying drawings, where:

FIG. 4 is a table which illustrates the effect of pressure and time on the shear strength of 7475-T6 diffusion bonds;

FIG. 5 is a table showing the bonding shear strength as a function of bonding time and pressure at two different bonding temperatures of 7475 aluminum alloy in the as-diffusion bonded and tempered conditions;

FIG. 15 is a table of the shear strengths of 7075 aluminum alloy diffusion bonds for various surface treatments at different bonding times and vacuum pressures for bonds made at 460° C. and a pressure of 500 psi;

FIG. 16 is a table of the nominal shear strengths of aluminum alloy sheet for the annealed and aged conditions; and FIG. 17 is a table providing surface roughness measurements for 7075 aluminum alloy after various surface treatments.

DETAILED DESCRIPTION OF THE PREFERRED EMBODIMENTS

While it is contemplated that with suitable modification the present invention may be applied to a variety of alloys having oxides of low solubility in the alloy, the present invention is described below with reference to the diffusion bonding and superplastic forming of 7475 aluminum and the diffusion bonding of 7075 aluminum.

Figure 1A:
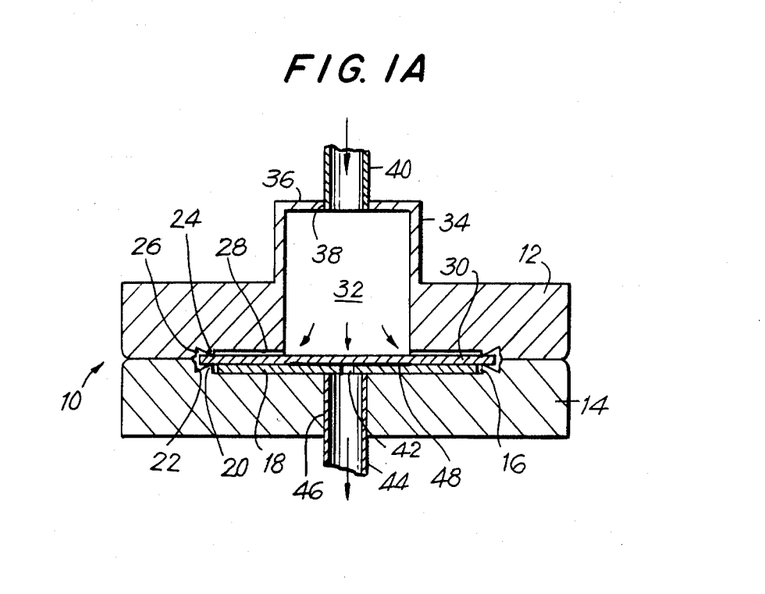
FIG. 1A is a cross-sectional, somewhat schematic view of a diffusion bonding and superplastic forming fixture in which two disc shaped members may be diffusion bonded according to the invention.

Referring to FIG. 1A, a fixture, shown generally as 10, includes an upper flange 12 and a lower flange 14 which may be bolted together by a series of nuts and bolts (not shown), the bolts extending through holes (not shown) in flanges 12 and 14, in a well known manner. Prior to diffusion bonding flanges 12 and 14 are cleaned by immersion in acetone, followed by air drying. Flange 14 has a circular recess 16 for receiving a disc shaped 7475 aluminum member 18 which is one of the aluminum members to be diffusion bonded. Flange 14 has an annular knife edge 20 defined by recess 16 and the sloped wall of an annular recess 22 of triangular cross section.

Flange 12 also has an annular knife edge 24 in direct opposition to knife edge 20 of flange 14. Knife edge 24 is defined by an annular recess 26 of triangular cross section similar to recess 22 and a circular recess 28 similar to recess 16.

A disc shaped 7475 aluminum member 30 is held between knife edges 20 and 24 so that its lower surface is in intimate contact with the upper surface of member 18. A cylindrical chamber 32 opening upon recess 28 is provided in flange 12. The inner wall of chamber 32 is in part defined by a cylindrical extension 34 of flange 12. Extension 34 has a planar upper wall 36 which has a circular opening 38 for receiving a pipe or tube 40. Tube 40 may be connected to a source of pressurized inert gas so as to apply pressure to the upper surface of member 30, thus causing a bonding pressure between the lower surface of member 30 and the upper surface of member 18. This pressure may be somewhat enhanced, due to the presence of a 3.1 millimeter diameter opening 42 at the center of member 18 which permits the application of a vacuum to a portion of the lower surface of disc 30 by means of a vacuum hose or tube 44 received in a hole 46 in flange 14.

Members 18 and 30 are fine grained 7475-WE6 aluminum alloy having thicknesses of 1.5 mm and 2.0 mm, respectively. This material is available from Alcoa which processes it with a proprietary rolling procedure, designated as Schedules E and B, respectively. During this procedure, the material is repeatedly deformed and heated to produce the fine grain structure characteristic of a material necessary for that material to exhibit superplastic properties. The composition of the alloy, by percentage weight, including the preferred percentage (in parenthesis) is:

| | |
|---|---|
| Zinc | 5.2–6.2 (5.7) |
| Magnesium | 1.9–2.6 (2.3) |
| Copper | 1.2–1.9 (1.6) |
| Iron | 0.12 max. |
| Chromium | 0.22 |
| Silicon | 0.1 max. |
| Manganese | 0.06 max. |
| Titanium | 0.06 max. |
| Others, each | 0.05 max. |
| Others, total | 0.15 max. |
| Aluminum | Remainder |

The diffusion bonding according to the invention was performed with these materials in the as-received WE6 temper. Subsequent to diffusion bonding, selected specimen are heat treated to the T6 temper by solution treating at 482° C. for one hour, water quenching, and aging at 121° C. for twenty four hours.

Members 18 and 30 are formed from the as-received material by cutting the material into discs of diameter 41.4 mm and 46.9 mm, respectively.

The as-received surface oxide coating of the surfaces of members 18 and 30 to be diffusion bonded to one another is removed by manual abrasion using successively finer SiC grinding papers of 240, 320, 400 and 600 grit. Ultrasonic rinsing in a high purity solvent, such as acetone, and in distilled water follows. The rinsed surfaces are then air dried with clean filtered air. Within fifteen minutes of diffusion bonding, the dried surfaces are brushed by stainless steel brushes in two directions substantially ninety degrees apart. The brushed surfaces are then exposed to a stream of filtered compressed air moving at a velocity sufficiently high to remove any brushings. The air stream may be provided by a commercial, compressed air laboratory duster prior to diffusion bonding.

To determine the effects of air exposure after surface preparation, the standard procedure outlined above is used. Before diffusion bonding, specimens were exposed to air at room temperature for times ranging from two hours to forty eight hours and at 516° C. for twenty four hours.

The standard procedure outlined above is also varied in that final grit size used for manual abrasion with SiC is varied from 120 to 600 grit. Surface roughness is then measured using a Perthometer C3A profilometer, with a stylus having a radius of 0.0025 mm and a stylus stroke of 5 mm.

Before diffusion bonding, fixture 10 (FIG. 1) is cleaned by immersion in acetone followed by air drying. Members 18 and 30 are then positioned in fixture 10 as shown. Commercial grade gas is used to pressurize tube 40. The pressure in tube 44 is reduced to approximately $40 \times 10^{-3}$ Torr for bonding. After pressurization and evacuation, fixture 10, which is disposed in a box furnace, is heated to the diffusion bonding temperature. Bonding is conducted at 516° C., the superplastic temperature, and at bonding pressures of 15, 50 and 100 psia (the difference in pressure between that in tube 40 and that in tube 44) for times between five minutes and two hundred forty minutes.

Figure 1B:
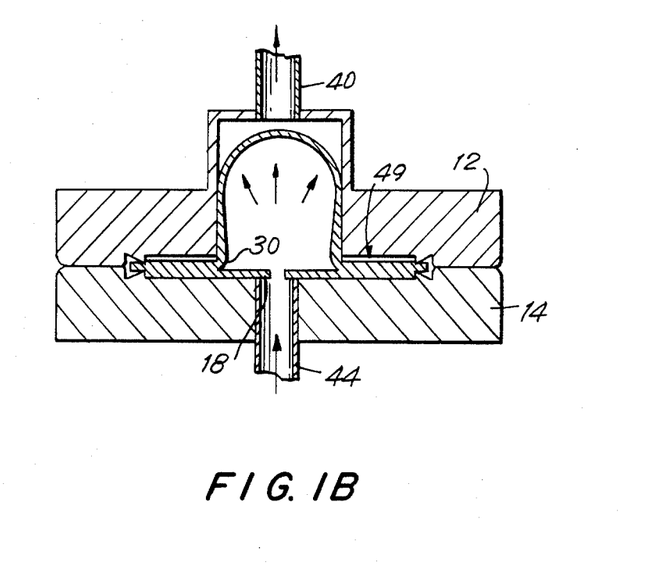
FIG. 1B is a view similar to FIG. 1A, in which one of the disc shaped members is superplastically formed after being diffusion bonded to another member.

Referring again to FIG. 1A, a region 48 on at least one of the upper surface of member 18 and the lower surface of member 30 exists wherein the thick oxide surface barrier on the "as received" material is not removed. As shown in FIG. 1B, if tube 44 is pressurized and tube 40 is connected to vacuum or ambient pressure, then the lower surface of member 30, by way of opening 42 in member 18, is exposed to a pressure tending to bulge or blow form member 30, as shown in FIG. 1B, thus creating the first known successful low pressure SPF/DB two sheet aluminum test component 49. During forming, the wall of chamber 32 is contacted by the sides of the formed part, but the amount of bulging of the part is insufficient for the dome of the part to contact any wall of chamber 32.

To integrate low pressure diffusion bonding with superplastic forming systematic changes in pressure and temperature during bonding and forming were conducted. Forming conditions are optimized by evaluating the effects of pressure and time, which ranged from 15 to 100 psia and one to three hours, respectively. Diffusion bonding was followed by superplastic forming in the same heating run. Typically, the bulge forming was conducted at 516° C. with pressurized argon gas supplied to tube 44.

For test component 49 of FIG. 1A SPF/DB occurred after first bonding at 516° C. and 15 psia for three hours followed by forming at 516° C. and 20 psia for three hours. Subsequent examination of the as-bonded and formed part revealed a symmetrical shape with wall thickness reductions up to approximately 90% and a total elongation of 166% ($\epsilon_t = 0.770$). Based on previous test data for similarly produced diffusion bonded joints, the shear strength of the bond the SPF/DB component 49 was comparable to that of unbonded 7475-0, i.e., 22 ksi.

Significant thickness variations were observed in component 49 because the wall of chamber 32 acted to restrict deformation when contact with the part was made. Once die contact has been made, the areas of the part in contact retain their thickness to that value at the instant of contact, while deformation proceeds where die contact has not been made. Thus, for cylindrically formed component 49, the minimum thickness occurs in the spherical dome, which never makes contact with the die.

A series of photomicrographs from formed component 49 show that the formation of elongated and equiaxed cavities was quite extensive in the thin region of the dome. In cavitating materials, such as 7475, cavities form at various locations, such as second phase particles and inclusions located on grain boundaries and grain junction triple points. Growth of the cavities, which is aided by diffusion and plastic flow under a state of stress, leads to their link-up and eventual intergranular failure. It is probable that such cavitation may be suppressed by back pressure techniques. A comparison of the microstructures from the formed part shows that there is very little change in the material grain size. In fact, there appears to be a slight grain refinement in the dome microstructure, which suggests that dynamic recrystallization may be occurring. In other work on 7475, grain refinement has been correlated with relatively higher strain rates, e.g., $5 \times 10^{-3}$/sec. and the formation of numerous cavity nuclei that do not grow to very large sizes. In the present work, since the forming pressure was arbitrarily held constant with time, the strain rate during forming was a variable. The resulting average strain rate from the 3 hour forming time was $0.7 \times 10^{-4}$ sec. It is believed that a better relationship between thinning and cavitation and such variables as strain rate, stress biaxiality, and frictional effects will improve the accuracy of process control.

Figure 2:
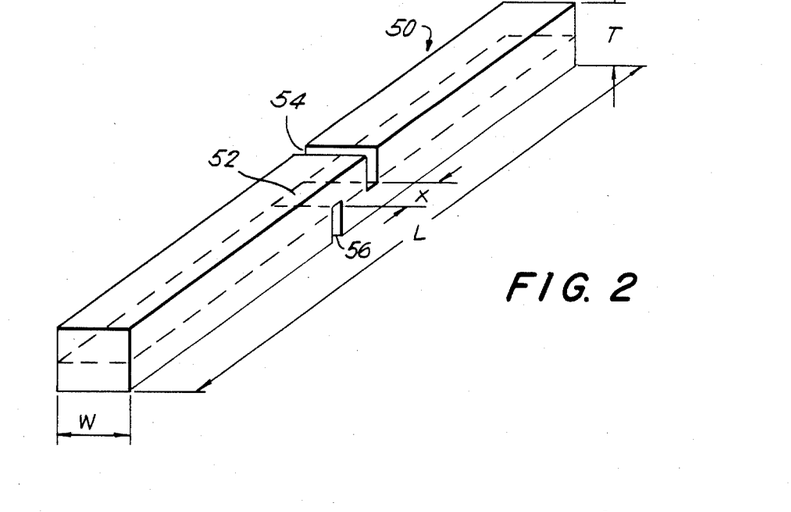
FIG. 2 is a perspective view of a single shear test specimen configuration used to evaluate specimens produced according to the invention.

Addressing the diffusion bonding in more detail, the shear strengths of diffusion bonds produced according to the invention are determined by testing lap-shear specimens 50 cut from the discs resulting from the bonding of members 18 and 30 as shown in FIG. 2. Lap shear specimens 50 are preferably of length L=38 mm, of width W=4.8 mm, and of thickness T equal to twice that of the sheet material. Overlap region 52 has a length x of 0.8 mm and a width equal to width W of the specimen. Notches 54 and 56 extend from the upper and lower surfaces of specimen 50, respectively, one at each end of overlap region 52, to a depth of 0.6 times the total thickness of specimen 50. The shear specimens are tensile loaded at a crosshead speed of 0.008 millimeters/second at room temperature. At least three tests to failure should be conducted to assure that representative results are obtained.

Shear and tensile tests were also conducted on unbonded 7475 aluminum alloy sheet (processed according the above mentioned Schedule B and E) in various heat treated conditions, including the thermal cycles used for diffusion bonding. A shear test specimen similar to that shown in FIG. 2 but of the nominal sheet thickness was used for the shear tests. Tensile tests were conducted on dog-bone shaped specimens, with a gauge section width and length of 5 and 25 millimeters, respectively. The tensile load was applied parallel to the sheet rolling direction at a crosshead speed of 0.008 millimeters per second at room temperature.

Figure 3:
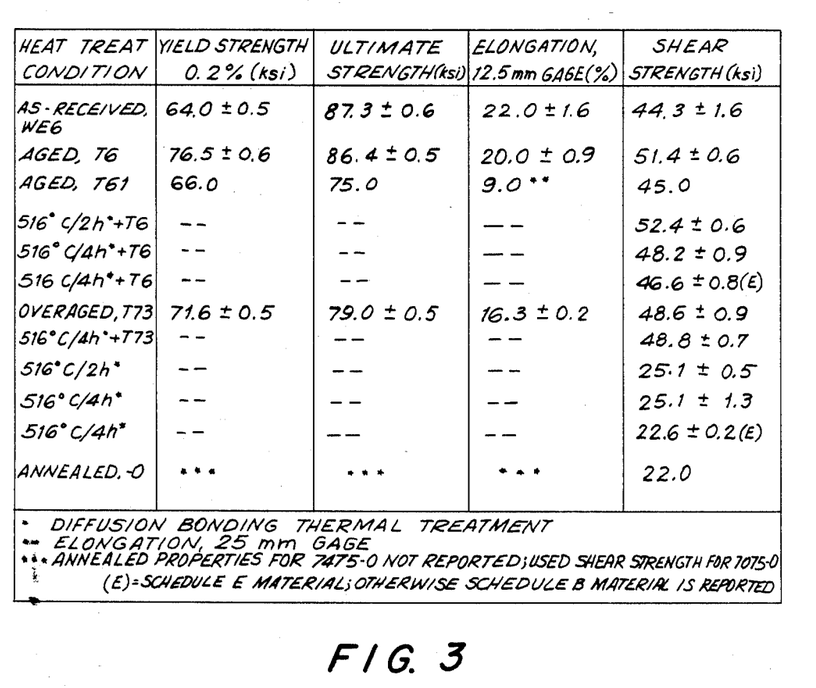
FIG. 3 is a table which summarizes the mechanical properties of 7475 aluminum which has been heat treated, but not bonded.

The summary of mechanical properties for the unbonded 7475 Schedule B and E alloy is presented in the table of FIG. 3. These tests were conducted to determine the effect of diffusion bonding thermal treatments on shear strength and thereby establish a baseline to evaluate the strength of diffusion bonds. Two thermal treatments for bonding were evaluated; 516° C. for two hours and 516° C. for four hours. Subsequent to these treatments, the material was shear tested or heat treated further and then tested, as indicated in FIG. 3. In general, the shear strength of the 7475 Schedule B materials in the T6 and annealed conditions is slightly higher than that of the nominal handbook values. It is believed that this may be attributed to the fine grain microstructure associated with the superplastic Schedule B material. It can be seen that a thermal treatment of 516° C. for two hours, followed by aging to the T6 condition, virtually did not affect shear strength, compared with aged materials, i.e., 7475-T6. There was a small decrease in shear strength after a thermal treatment of 516° C. for four hours, followed by aging; this may have been caused by the slight increase in grain size that occurs as a result of the four hour treatment. There were no significant effects of the bonding thermal treatments on shear strength for any of the other conditions evaluated.

The shear strengths of 7475-T6 aluminum alloy diffusion bonds, prepared using the "standard" procedure and indicated combinations of pressure and time, are presented in the table of FIG. 4. Selected bonding conditions are tested two or more times to determine reproducibility. For these cases, diffusion bonded specimens are fabricated and tested separately over a twelvemonth period.

The data for each condition, including those from initial tests, as set forth in the table of FIG. 5, have been combined to give an overall average shear strength for each bonding condition. In general, the data show that bond shear strengths are consistent for various conditions and, therefore, indicate the reproducibility of the diffusion bonding process. The highest strength conditions were approximately 100% that of unbonded 7475-T6 after bonding at 100 psia. However, the majority of bonds made at 50 psia for four hours failed during lap-shear testing such that the fracture plane was not along the bond interface but in the adjacent 7475 base metal, as shown in FIG. 4. This was attributed to two factors: the presence of a high-quality diffusion bond resistant to shear failure, and a bending moment in the shear specimen that shifted the primary stress concentration to the base metal, where failure occurred. These results indicate that bond strengths approaching that of 7475-T6 are also attainable at 50 psia.

Figure 6:
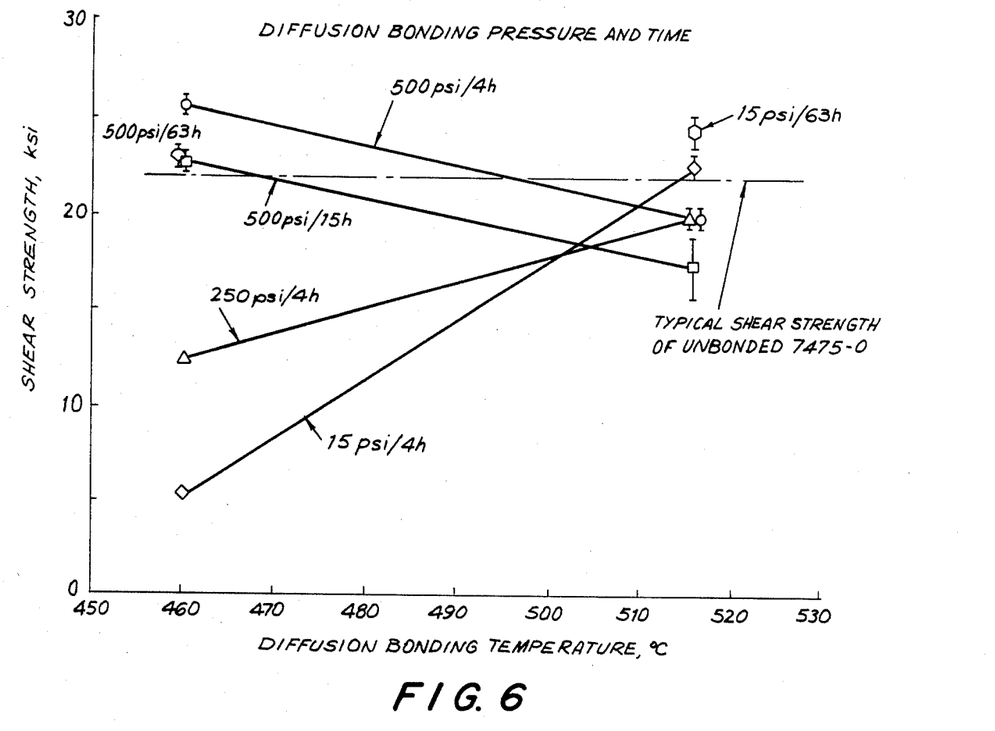
FIG. 6 is a graphical representation of data illustrating the effect of bonding temperature on the shear strength of as-bonded 7475 aluminum alloy.
Figure 7:
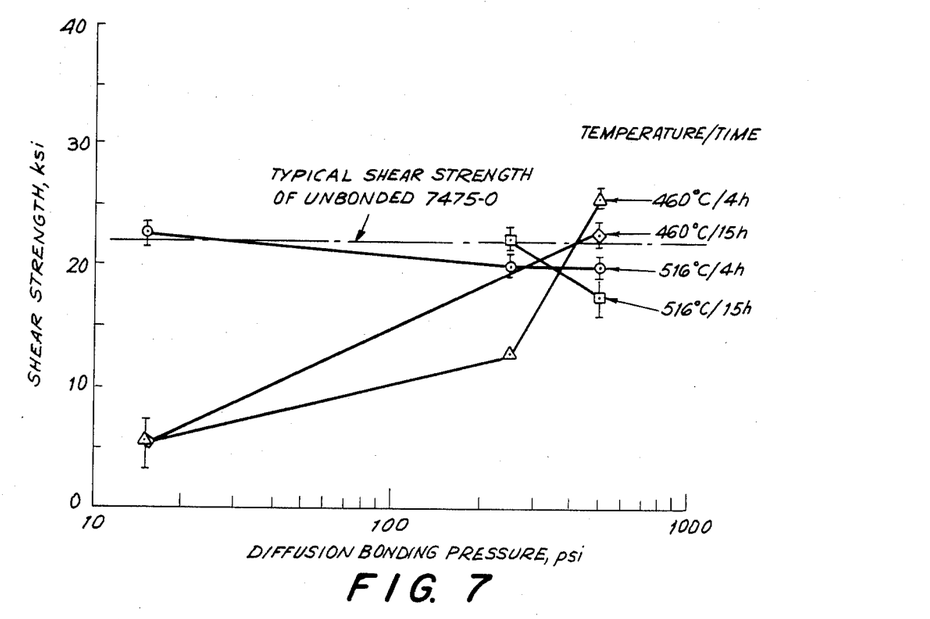
FIG. 7 is a graphical representation of data illustrating the effect of bonding pressure on shear strength of as-bonded 7475 aluminum.

The shear strengths of as-bonded 7475 as a function of bonding temperature are shown in FIG. 6. At 460° C., a bonding pressure of 500 psi is required to achieve shear strengths comparable to that of unbonded 7475-0 sheet. At 516° C., the nominal superplastic forming temperature, the effect of pressure was not as significant, and high strengths were achieved after bonding at 15 psi. This illustrates the significance of bonding at the superplastic forming temperature to reduce required bonding pressure. The effect of pressure is further illustrated by comparing strengths of the as-bonded condition as a function of bonding pressure in FIG. 7. Bonding at 460° C. and 15 psi resulted in low shear strengths, but high strengths were produced at 460° C. and 500 psi. Bonding at 516° C. for four hours resulted in bond strengths approximately 100% that of 7475-0 material, at all bonding pressures.

Figure 8:
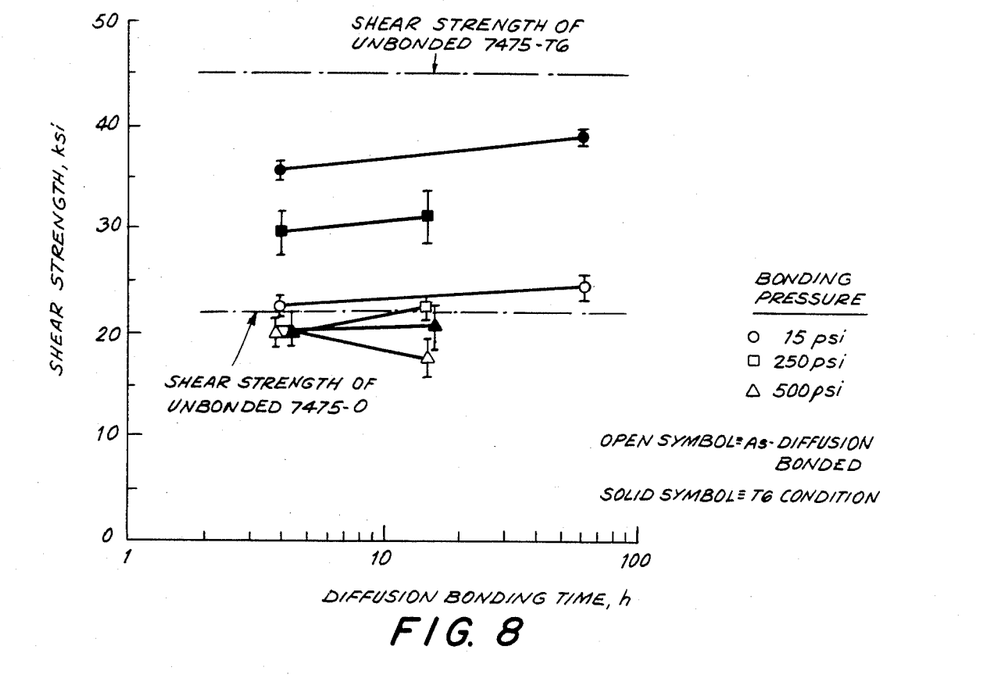
FIG. 8 is a graphical representation of data illustrating the effect of bonding time on the shear strength of 7475 diffusion bonds made at 516° C.

The effect of bonding time on shear strengths for bonds made at 516° C., is shown in FIG. 8. The shear strengths of bonds made at 15 psi appear to be slightly enhanced with time.

Figure 9:
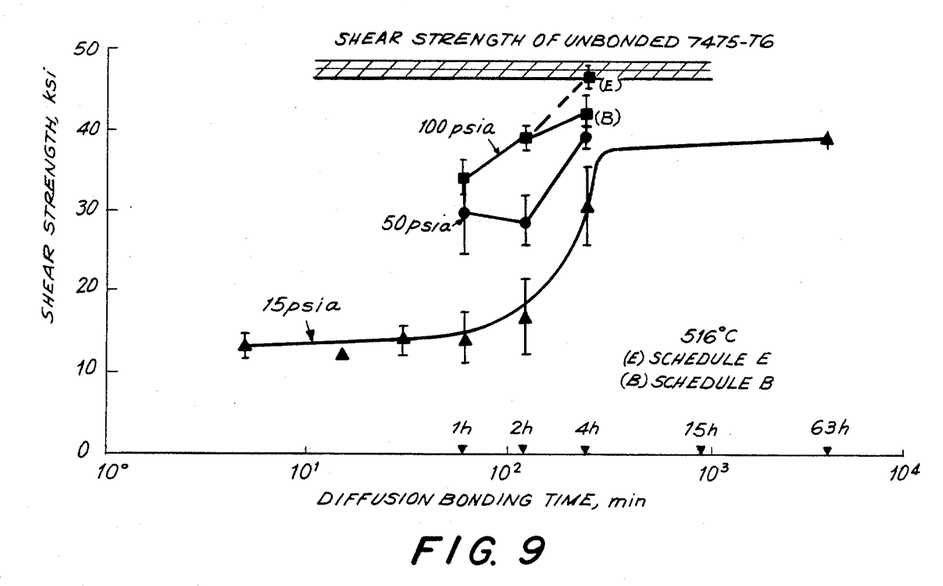
FIG. 9 is a graphical representation of selected portions of the data of FIG. 4 and FIG. 5 illustrating the effect of bonding pressure and time on the shear strength of 7475-T6 aluminum diffusion bonds.

The effects of pressure and time on shear strength are shown in FIG. 9. It is evident that shear strength is time and pressure dependent for these conditions and that a minimum pressure-time condition must be satisfied to attain high bond strengths. For example, the data show that four hours is an adequate processing time at the higher pressures but is marginal at 15 psia, which could account for the large scatter in shear strength at that pressure. The highest shear strength achieved was equal to that of unbonded 7475-T6, after bonding at 516° C. and 100 psia for 4 hours. In general, shear strength values were more consistent for the higherstrength diffusion bonded conditions. For example, at 50 psia and four hours, the standard deviation was only 3%, while at 15 psia and four hours, it was approximately 17%. In this work, low strength and large scatter in strength are generally attributed to incomplete bonding due to insufficient time or pressure. In contrast, when other cases of low strength are observed, such low strength is associated with traceable causes of contamination, such as improper surface preparation, detectable surface discoloration after bonding, or loss of vacuum during bonding. Those data are not included in the overall averages in the table of FIG. 4.

Figure 10:
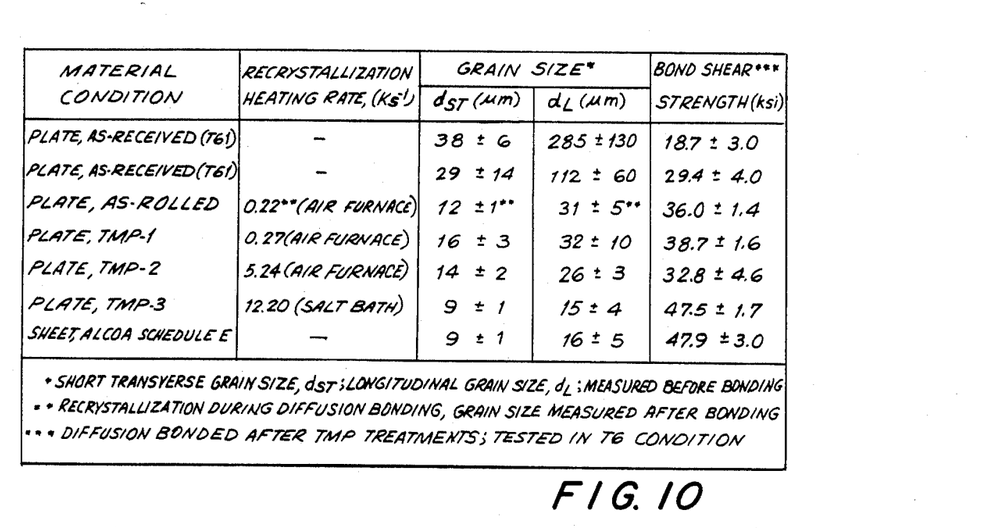
FIG. 10 is a table showing bond shear strength and grain size as a function of recrystallization rate after thermomechanical processing.
Figure 11:
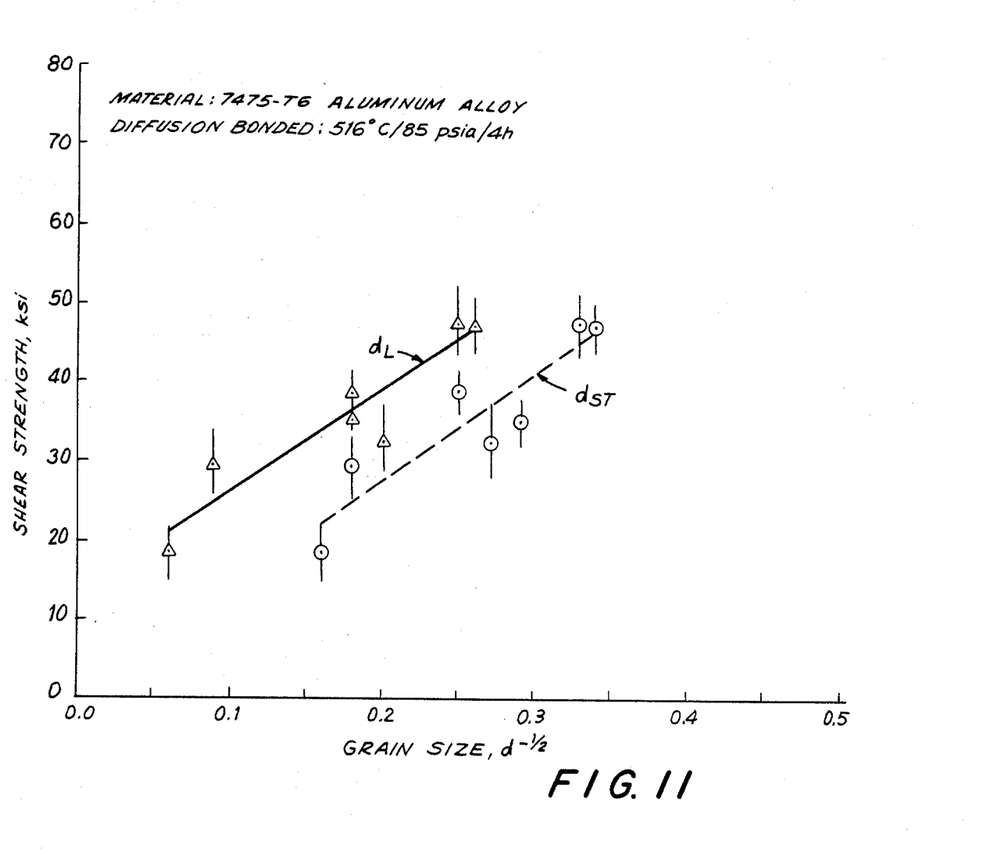
FIG. 11 is a graphical representation of the data illustrating the effect of grain size on bond shear strength.

The shear strengths of 7475-T6 aluminum alloy diffusion bonds, prepared using the "standard" procedure and indicated conditions, are presented in the table of FIG. 10. This table describes the results of thermomechanical processing (TMP), which involves warm rolling and recrystallization, to modify the microstructure of a coarse-grained 7475 aluminum alloy plate and subsequent shear tests to determine the effect of microstructure on bonding behavior. It can be seen that a coarse-grained plate, having a transverse and longitudinal grain size of 38 and 285 microns respectively, can be transformed by TMP into a very fine-grained material, having a transverse and longitudinal grain size of 9 and 15 microns, respectively. After diffusion bonding these materials using the same procedure, it can be seen that the fine-grain material had a bond shear strength of 47.5 ksi, compared with only 18.7 ksi for the coarse-grained plate, i.e., the bond shear strength of the fine-grained material was 2.5 times greater than that of the coarse-grained plate. Furthermore, it can be seen that the bond strength of the fine-grained TMP material is the same as that of commercially produced Alcoa 7475-Schedule E superplastic material. The bond shear strengths of 7475-T6 as a function of grain size are shown in FIG. 11. It can be seen that bond shear strength systematically increases with decreasing grain size, d represented by $d^{(-\frac{1}{2})}$ for both transverse and longitudinal grain sizes; the fine-grained superplastic material has the highest bond strengths. These results are of major significance because they further demonstrate that diffusion bonding is greatly improved in alloys that have characteristic fine-grained microstructures usually associated with superplasticity. The data lead to the conclusion that improved diffusion bonding is made possible by enhanced localized surface deformation caused by a superplastic microstructure, which leads to extensive oxide film disruption.

The improvement in diffusion bonding behavior and strength of aluminum alloys that is achieved with fine-grained, superplastic materials is further illustrated by comparing diffusion bonding between 2219 and 7475 aluminum alloy couples. The data described herein represents a comparison between the diffusion bonding behavior of a 2219/2219 similar couple and a 2219/7475 dissimilar couple. The 2219 alloy was coarse-grained and non-superplastic and the 7475 alloy was fine-grained and superplastic; both were sheet alloys, 0.075 inch thick. Each couple received the same standard pre-bond preparation, already described above, and each was subjected to the same bonding procedure, also described above. The bonding operation was conducted at 516° C. and 85 psig for 4 hours. Subsequent to bonding, it was found that the 2219/2219 couple did not bond but that the 2219/7475 couple appeared to be very well bonded. Subsequently, the 2219/7475 couple was machined into lap-shear test specimens that were tension loaded to determine the as-bonded shear strength. In every case, the 2219/7475 bonded specimens did not fail at their bond lines but, instead, failed in the 7475 base metal along a shear path parallel to the bond line. The 2219/7475 bond interfaces were subjected to average shear stresses greater than 18 ksi before failure occurred in the adjacent base metal. Metallographic examination of the 2219/7475 bond interface revealed that the interface was free of defects and that the prior bond line was not continuous, which suggested that grain boundary movement had occurred. These observations are consistent with high strength bonds. Based on these results, it can be concluded that low pressure diffusion bonding was made possible by the extensive disruption of the surface oxide film achieved as a consequence of the extensive localized microscopic surface deformation of the superplastic material. It is believed that superplastic deformation of the surface of the 7475 alloy causes disruption of the oxide layers on the surface of the 2219 alloy, thus facilitating bonding.

The effect of bonding time on interface microstructure after bonding at 15 and 50 psia may be investigated using standard metallographic techniques. Generally, the size and number of interfacial voids decreases with time at each pressure. After four hours, the higher pressure bonds are relatively freer of small interfacial voids. Similar effects of pressure and time on interfacial voids and strength also have been observed in other materials and have led to the development of theoretical models for diffusion bonding that take into account pressure, time, and surface roughness. Such models are mainly based on various stages of bonding, which include plastic deformation of surface asperities, creep deformation of the surfaces, and diffusional processes. In the present work, the results indicate that the behavior of interfacial voids and the degree of bonding may be governed to some extent by the same mechanisms. At the lowest bonding pressure, 15 psia, longer times are necessary, than at 50 and 100 psia, to achieve intimate contact of the surfaces by plastic flow and creep and, subsequently, higher strength. Based on initial data represented by the table of FIG. 5, it is concluded that the shear strength of bonds made at 15 psia for times greater than four hours was not significantly increased compared to bonds made for four hours at the same pressure. However, in view of the data of FIG. 4 which indicate that the overall average shear strength after four hours is actually lower, longer bonding times may be more beneficial than realized. This is illustrated by the data presented in the table of FIG. 4 for 15 psia. After four hours, the shear strength is 30.0±0.5 ksi and after sixty three hours, it is 38.8±0.5 ksi.

Figure 12:
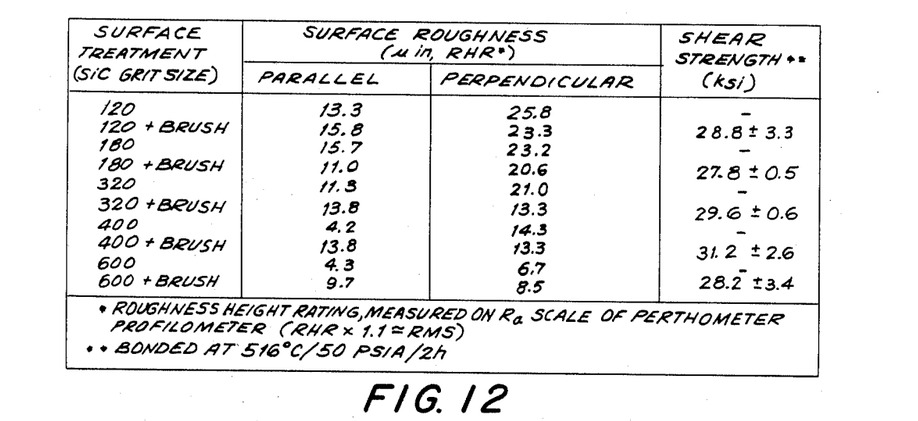
FIG. 12 is a table which presents data illustrating the effect of surface finish on the shear strength of 7475-T6 aluminum diffusion bonds in accordance with the present invention.
Figure 13:
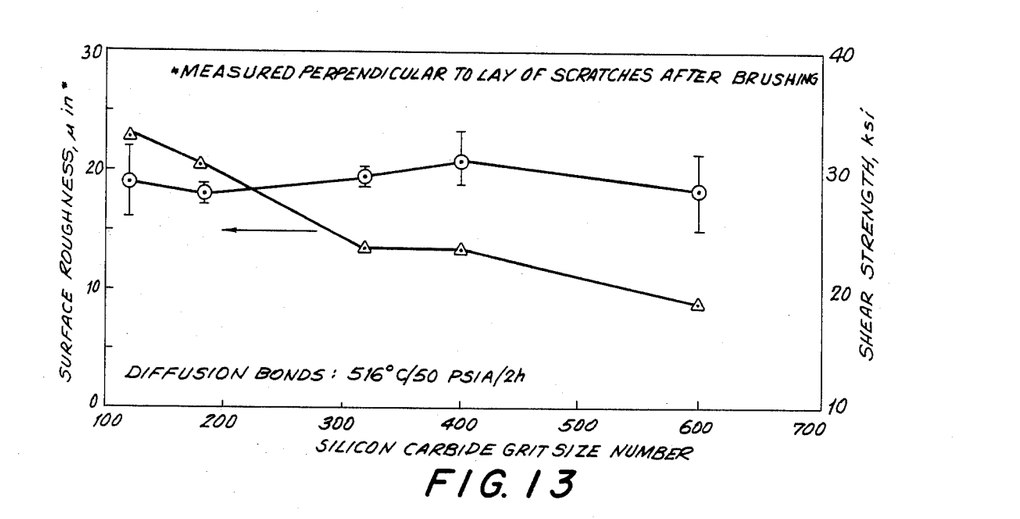
FIG. 13 is a graphical presentation of the effect of abrasive grit size on surface roughness and shear strength of 7475-T6 diffusion bonds in accordance with the present invention.

The surface roughness of 7475 aluminum sheet after various pre-bonding abrasive treatments and the corresponding bond shear strengths are presented in the table of FIG. 12. The effect of abrasive grit size on surface finish and shear strength is shown in FIG. 13. Generally, the results indicate that there was no significant effect of abrasive grit size on shear strength after bonding at 50 psia for two hours, although surface roughness decreased with increasing grit number, i.e., with finer grits, as expected. There also was no apparent effect of pre-bond surface roughness on interface microstructure after bonding.

In general, the interface of each bond was similar to the others and consisted of intermittent voids and flattened regions, presumably bonded, regardless of initial roughness. In comparison, it was observed that bonding for four hours at the same pressure resulted in void-free interfaces and higher strengths (FIG. 4). The similarity in strength and interface microstructure of the two hour bonds suggests that the range of surface roughness investigated, i.e., approximately 9 to 26 μm in RHR, was too small to affect the time to flatten long- and short-range surface asperities.

It is believed that the effect of surface roughness is important to aluminum diffusion bonding for two reasons. First, it is intimately related to the pressure and time required to achieve intimate surface contact through plastic flow and creep processes. A very rough surface would be expected to have larger peaks and valleys than a smooth surface and thus should require more time and pressure for flattening. In this case, the smoother surface would be preferred for achieving intimate contact. Second, the surface roughness or topography should have a distinct effect on oxide deformation and fragmentation at the bond interface. The localized deformation of surface peaks and valleys is believed to promote oxide break-up and expose unoxidized aluminum surfaces for bonding. Since perfectly smooth, flat surfaces would minimize this effect, rougher surfaces would be preferred in this case. The optimization of surface roughness should thus be a compromise between these factors, based on how they affect the mechanical properties of diffusion bonds. It appears that the superplastic characteristics of the 7475 aluminum alloy make a unique contribution in overcoming roughness variations by virtue of enhanced flow behavior at 516° C.

The effect of unusual pre-bond surface treatments of aluminum alloy specimens on diffusion bond properties also was examined. In two cases, only one 7475 aluminum alloy disk from each specimen was prepared in the standard manner described above before bonding. For one case, the remaining disk was initially cleaned in the standard manner and then was heated in air at 516° C. for twenty four hours prior to bonding. For the second case, the remaining disk was left in the as-received condition, with only acetone degreasing prior to bonding. A third case involved cleaning both aluminum alloy disks in the normal manner and subsequently heating them in air at 516° C. for twenty four hours prior to bonding. All of these pre-bond conditions resulted in diffusion bonds that had extremely low shear strengths. Further, ultrasonic C-scans of the bonded areas indicated the presence of large defect areas. The interfaces of these bonds were significantly different from each other, and each was radically different from those specimens in which the surfaces of both aluminum disks were prepared by the standard procedure. For example, as a result of heating in air at 516° C. for twenty four hours, the interface appeared almost as a continuous void, but at higher magnification, the presence of a partial interfacial structure was revealed. This constituent is believed to be a remnant of the surface oxide formed during the preliminary 516° C. heat treatment. It is likely that most of the oxide fractured during metallographic preparation and was not retained in the mounting medium during polishing. The thickness of the interfacial layer is approximately 10 μm, which is of the order of oxide thickness expected to form under the heating conditions imposed. In contrast, the interface of the specimen left in the as-received condition, is characterized by a nearly continuous series of elongated interfacial constituents, approximately 1 μm in thickness, having either microfissures or voids along their centerlines. Preliminary analysis by Auger electron spectroscopy indicates that the as-received surface of 7475 aluminum alloy predominantly comprised oxides of magnesium and aluminum. It has been found that diffusion bonds between as-received surfaces have virtually no strength and thus serve as effective barriers to bonding in SPF/DB applications.

Figure 14:
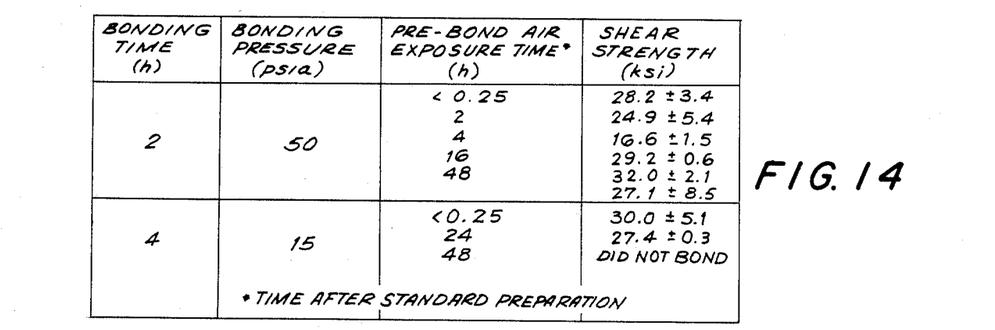
FIG. 14 is a table presenting data concerning the effect of air exposure on the shear strength of 7475-T6 diffusion bonds in accordance with the invention.

The effect of exposing prepared aluminum alloy surfaces to laboratory air for various times, prior to bonding, on bond shear strength is shown in the table of FIG. 14. Normally, specimen surfaces are exposed to air for fifteen minutes or less after the standard surface treatment described above. Subsequent to such exposure, diffusion bonding at 50 psia for two hours or 15 psia for four hours resulted in average shear strengths of 28.2±3.4 and 30.0±5.1 ksi, respectively. In the case of bonds made at 50 psia for two hours, the results indicate that air exposure of aluminum alloy disks of up to forty eight hours had no significant effect on bond shear strengths. The average shear strength value after air exposure for four hours (16.6±1.5 ksi) is anomalous and cannot be explained. For diffusion bonds made at 15 psia for four hours, room temperature air exposure for twenty four hours resulted in no significant loss of strength, but exposure for forty eight hours resulted in complete lack of bonding. Generally, these strength data for both bonding conditions were characterized by a wide range of scatter, which is typically observed in relatively lower strength bonds.

Generally, the oxidation behavior of aluminum can be described according to a parabolic rate law. For pure aluminum, the oxide that forms on a freshly cleaned surface in air at room temperature after the first few minutes is probably an amorphous film about 15 Å thick; after twenty four hours and forty eight hours exposure, it is about 20 Å and 25 Å thick, respectively. In the method of the present invention, it is assumed that similar oxides and thicknesses are formed. Thus, the oxide films that form on prepared 7475 aluminum alloy surfaces after exposure to laboratory air at room temperature for times up to twenty four hours do not significantly affect the shear strength of diffusion bonds made under the conditions specified above. The oxide films are believed to be thin enough to be disrupted and fragmented during bonding and thereby permit metal-to-metal bonding between the aluminum surfaces. However, after air exposure for forty eight hours and subsequent bonding at 15 psia, there is a complete lack of bonding, which indicates that the bonding pressure was probably insufficient to disrupt the relatively thicker oxide layer. A bonding pressure of 50 psia is apparently sufficient to break the oxide layer that is formed after forty eight hours.

Diffusion bonding is also performed with 7075 aluminum sheet thickness is 1.6 mm. The composition of this alloy, by percentage weight is:

| Zinc | 5.1–6.1 |
|---|---|
| Magnesium | 2.1–2.9 |
| Copper | 1.2–2.0 |
| Iron | 0.50 max. |
| Chromium | 0.18–0.35 |
| Silicon | 0.40 max. |
| Manganese | 0.30 max. |
| Titanium | 0.20 max. |
| Other, each | 0.05 max. |
| Other, total | 0.15 max. |
| Aluminum | Remainder |

The shear strengths of 7075 aluminum alloy diffusion bonds are presented in the table of FIG. 15. This alloy was not fine-grained and was not treated so as to produce superplastic properties. In general, the data show that surface treatments involving a final stainless steel brushing resulted in higher strengths than those without such a brushing. The highest shear strength for the as-bonded condition after using surface treatment #2 (i.e., SiC grind-acid etch-brush) was about 83% of the nominal shear strength of annealed 7075 aluminum sheet. The nominal shear strengths of 7075 and 7475 are shown in the table of FIG. 16. For the T6 temper, the bond strength was 50% that of the sheet value. Similarly, after surface treatment #3 (i.e., acetone rinse-brush), the as-bonded and T6 strengths were about 87% and 58% of the sheet values. It is also apparent that shear strengths were not significantly affected by diffusion bonding time. It is very significant that very high shear strengths were not achieved in the coarse-grained, non-superplastic 7075 aluminum alloy, as compared to the very high shear strengths that were achieved in the fine-grained, superplastic 7475 aluminum alloys.

It was determined by preliminary experimentation that evacuation of the specimen chamber was absolutely necessary in order to avoid excessive oxidation of the specimens. The effect of surface treatment on bond shear strength was determined by an initial set of experiments in which the vacuum-side pressure was 150 $\mu$m; subsequent experiments at 20 $\mu$m pressure also were conducted. At diffusion bonding times of four hours, the as-bonded shear strength is approximately twice as great at a vacuum-side pressure of 20 $\mu$m as that achieved at 150 $\mu$m, as shown in the table of FIG. 4 for 7475 aluminum. In addition, specimens bonded at 20 $\mu$m, considered to be a "soft" vacuum, had no apparent surface contamination or discoloration.

Surface treatments with acid etching as the final step always resulted in low strength failures at the diffusion bond interface. The worst results were associated with alkaline etching, after which there was virtually no bonding of the aluminum disks. The negative effects of chemical pickling has been attributed to the formation of hydrated oxides, which were considered even more detrimental to bonding than the thin oxides formed after machining.

SiC grinding was also used to help eliminate or reduce surface films but its usefulness is questionable. Simple degreasing followed by brushing appears to be nearly as effective as SiC grinding, acid etching, and brushing. However, it is the latter treatment which yields consistent results.

The characteristics of aluminum sheet after various preparation treatments ar shown by the roughness measurements, surface profiles, and topographic features in the table of FIG. 17. Compared with the as-received condition, roughness was essentially unaffected by surface treatment, with the exception of the acetone-stainless steel brushing treatment. In that case the roughness was nearly twice that of the other conditions. The relative coarseness of this surface is evident by comparing the surface profiles. Direct brushing of the as-received surface resulted in greater peaks and valleys.

Although the average surface roughness for the other treatments is about the same, there are apparent differences between their surface profiles, especially in a direction parallel to the lay of the scratches. These differences indicate that surface roughness measurements do not always fully describe the actual surface topography. This point is further illustrated by comparing the surface features. For example, the appearance of as-received, SiC grind-acid etch, and SiC grind-acid etchbrush surfaces are radically different; yet their surface roughness measurements are about the same. The as-received surface is characterized by a mixture of very finely spaced striations and randomly spaced pock marks, scratches, and dark blotchy areas. After acid treatment, the grinding scratches are removed and the surface appears as a grain boundary-like mosaic, interspersed with very small etch pits. After brushing the surface is characterized by coarse, non-uniformly spaced scratch marks with discernible peaks and valleys and by regions where the metal appears to be "folded over" on itself. The specific effect of these features on diffusion bond strength was not determined.

Fractographic observations of diffusion bond interfaces from 7475 and 7075 aluminum specimens after shear testing revealed a high degree of metallurgical bonding. The shear strength of a specimen which received a surface treatment consisting of SiC grinding, acid etching, and brushing followed by bonding at 460° C. and 500 psi for sixty three hours was comparable to that of 7475-0. Deformation and fracture occurred by a mixture of tension and shear, where tensile forces were highest at the ends of the interface and lowest at the middle. The fracture in the above-mentioned specimen was caused mainly by tension and is characterized by the formation of microvoids and equiaxed dimples with ductile tear ridges. A shear region was present from the middle of the interface, with elongated dimples aligned in the direction of loading. The topography of the center shear region consisted of areas which were either flat and featureless or which had shear dimples.

A mixed mode area contained flat shear regions and equiaxed dimples. A variety of particles were present, some of which cracked, and were distributed on the fracture surface (i.e., the prior diffusion bond interface). The presence of such particles did not appear to interfere with the bonding process or to degrade shear strength. In general, specimens in the as-bonded condition were quite ductile and were capable of withstanding the considerable bending which occurred during loading.

Another specimen was bonded using the same conditions as those for the specimen described above, and had a shear strength of 37 ksi, which is approximately 82% that of unbonded 7475-T6 sheet. Fractographs from the mixed tensile-shear region showed some equiaxed dimple formation, but the region consisted mostly of coarse terraced areas with flat shear-like surfaces. In the center region, where shear dominated, there was no dimple formation. The surface was characterized mainly by either large flat areas with a very fine stippled texture or rough uneven areas. The relatively low ductility of bonds in the T6 condition was manifested during testing, where less bending of the specimen was observed up to the point of failure.

A 7075-T6 specimen had a prior surface treatment of SiC grinding, acid etching, and brushing and was bonded at 460° C. and 500 psi for fifteen hours. The fracture zone transition from mixed mode to shear was inspected. The mixed mode zone was flatter looking than that observed for 7475-T6 but also had regions with equiaxed dimple formation. The center shear zone was a mixture of mostly very flat areas interspersed with randomly spaced particles. The shear strength of this specimen was 24 ksi, which is approximately 50% that of unbonded 7075-T6 sheet. Bonded 7075-T6 specimens appeared to be less resistant to bending than were 7475-T6 specimens. The fine stippled texture described for 7475-T6 was not observed in 7075-T6 specimens, and thus may be a characteristic of better bonds.

The effect of bonding time on the diffusion bond interface in 7475 and 7075 aluminum specimens was also evaluated. In these cases, both alloys were prepared using the same surface treatment and bonding parameters: SiC grinding, acid etching, and brushing followed by bonding at 460° C. and 500 psi for four, fifteen and sixty three hours. For the 7075 specimens the vacuum-side pressure was 150 $\mu$m and for the 7475 group it was 20 $\mu$m. In both cases, the bond interface was always discernible but becomes less pronounced with time. However, the shear strengths of these specimens did not vary significantly with time. For example, the strengths of the 7475 bonds were 25.6, 22.8, and 23 ksi, respectively. This indicates that strength is not readily predictable from interface appearance. This point is further illustrated by comparing 7075 and 7475 bond interfaces after four hours. Although their interfaces look similar, the shear strength of the 7475 aluminum specimen (25.6 ksi) was over three times greater than that of the 7075 bond. The only apparent difference between these microstructures is the large number of coarse particles present in the matrix of the 7075 aluminum which is typical for this alloy.

The effect of heat treatment on the microstructure of diffusion bonds in 7075 and 7475 specimens was also investigated. For each alloy, the as-bonded (i.e., annealed) microstructure is characterized by a large distribution of various particles, within the matrix, at grain boundaries and along the bond interface. Porosity or voids were virtually absent at the interface. The matrix microstructure is seen more clearly in a transmission electron micrograph (TEM) of the interface region of the 7475 specimen. Elongated, black particles, identified as $MgZn_2$, were located throughout the matrix as well as at the interface. Other particles of varying size and shape observed at the interface were not identified. In general, TEM observations revealed that the bond interface tends to be parallel to adjacent elongated grains, is not perfectly flat, and is like a normal grain boundary. Slight "peak and valley" irregularities of the interface may be the result of grain boundary migration, which is also evidenced by apparent interfacial dissolution.

After solution heat treatment, $MgZn_2$ particles are redissolved in the matrix. In each case, the microstructures are characterized by clearly defined grain boundaries and by the remaining insoluble intermetallic particles. After subsequent aging to the T6 condition, there is no detectable microstructural change visible in optical photomicrographs. However, it is apparent that after solution treatment and aging, the interfaces of both alloys are barely discernible in some regions. TEM observations of the interface in a 7475-T6 bond reveal that the interface looks more like the adjacent grain boundaries than an artificially created planar interface. The particles located at the interface were not identified but are similar in size and shape to those within the matrix.

While the entire volume of each member being diffusion bonded may have the fine grain structure generally associated with superplasticity, if only diffusion bonding is to be performed then it is only necessary for the surface layers of the alloy to have such fine grain structure.

It is of great importance to note that unlike prior assumptions concerning the amount of deformation necessary to disrupt the oxide coatings, the pressures used in the method of the present invention do not produce significant macroscopic deformation. While there may be some significant localized microscopic deformation at the diffusion bonding interface, if the thickness of the discs bonded together is measured before bonding and compared to the thickness of the bonded component, there is only negligible deformation. In fact, such measurements lead to the conclusion that the macroscopic deformation is substantially zero percent.

In summary, high strength, metallurgically bonded joints were produced in fine-grained, superplastic 7475 aluminum alloy at the superplastic forming temperature, 516° C., using very little pressure. This was possible after relatively simple surface treatments and was accomplished without the necessity of interlayer diffusion aids. In the as-bonded and T6 conditions, joint shear strengths were comparable to that of 7475-0 sheet and 7475-T6, respectively. This result is of major significance because it indicates that 7475 diffusion bonds can be strengthened by conventional heat treatments involving water quenching. Microstructural and fractographic observations indicate that bond interfaces possess grain boundary-like characteristics. The results demonstrate the feasibility of diffusion bonding of aluminum alloys or alloys having oxides of low solubility in the alloys at reasonable pressures without significant macroscopic deformation.

Although shown and described in what are believed to be the most practical and preferred embodiments, it is apparent that departures from the specific methods described and shown will suggest themselves to those skilled in the art and may be made without departing from the spirit and scope of the invention. We, therefore, do not wish to restrict ourselves to the particular methods described and illustrated, but desire to avail ourselves of all modifications that may fall within the scope of the appended claims.

We claim:

1. A method for diffusion bonding surface layers of an alloy having surface oxide coatings of low solubility in the alloy, comprising the steps of:
   treating said alloy so that at least the surface layers to be bonded have a fine grain structure;
   removing existing surface oxide coatings from the surface layers to be bonded;
   diffusion bonding the surface layers to one another by placing the alloy to be bonded under a pressure sufficient to cause disruption of the oxide coatings and insufficient to cause macroscopic deformation of the alloy while heating the alloy in a non-oxidizing atmosphere for a time sufficient for diffusion bonding to occur.

2. The method of claim 1, wherein said alloy is an aluminum alloy.

3. The method of claim 2, wherein said aluminum alloy is 7475 aluminum.

4. The method of claim 2, wherein said aluminum alloy is 7075 aluminum.

5. The method of claim 1, wherein said step of treating said alloy comprises:
   thermomechanically processing the surface layers sufficiently to deform the near surface microstructure; and
   recrystalizing the deformed microstructure to create said fine-grained structure.

6. The method of claim 1, wherein said step of treating said alloy comprises localized mechanical surface deformation and heating of the alloy to cause recrystallization.

7. The method of claim 1, wherein said pressure is less than 1000 pounds per square inch.

8. The method of claim 1, wherein said pressure is less than 100 pounds per square inch.

9. The method of claim 1, wherein said step of heating is performed for a time ranging from one half hour to ten hours.

10. The method of claim 1, further comprising the step of heat treating the alloy after diffusion bonding.

11. The method of claim 1, further comprising the step of tempering after diffusion bonding has occured.

12. The method of claim 1, further comprising the step of:
cooling the alloy to room temperature, after bonding, over a period of at least approximately twenty minutes.

13. The method of claim 1, wherein said step of treating the surface layers comprises:
abrading with successively finer grades of grinding paper;
rinsing with one of high purity acetone and distilled water;
abrading with a metallic brush; and
removing the brushings.

14. The method of claim 13, wherein said step of abrading with a metallic brush comprises:
abrading in a first direction;
abrading in a second direction at an angle of approximately ninety degrees with respect to said first direction.

15. The method of claim 13, wherein said step of removing the brushings comprises:
exposing brushed surfaces to a stream of compressed, filtered air moving at a velocity sufficiently high to remove said brushings.

16. The method of claim 13, wherein said grades of grinding paper vary from 240 grit to 600 grit SiC grinding paper.

17. The method of claim 1, further comprising the step of:
placing components of said alloy in a fixture;
exposing a first opposite surface to a first surface layer to be diffusion bonded to one of a partial vacuum and a pressurized gas; and
exposing a second opposite surface of a second surface layer to be diffusion bonded to another of said partial vacuum and pressurized gas.

18. The method of claim 1, wherein said non-oxidizing atmosphere is produced by surrounding said alloy with one of an inert gas and a soft vacuum.

19. The method of claim 1, further comprising the step of:
superplastically forming at least one of the alloys to change the shape thereof.

20. The method of claim 1, wherein at least the surface layers of the alloy have superplastic properties.

21. A method for diffusion bonding surface layers of alloys having surface oxide coatings of low solubility in the alloy, comprising the steps of:
treating the surface layer of a first of said alloys so that it has a fine grained microstructure characteristic of superplasticity;
treating the surface layers to be bonded to remove existing surface oxide coatings;
diffusion bonding the surface layers to one another by placing the alloys to be bonded under sufficient pressure to cause disruption of the oxide coatings and insufficient to cause macroscopic deformation of the alloys while heating the alloys in a nonoxidizing atmosphere for a time sufficient for diffusion bonding to occur.

22. The method of claim 21, wherein the surface layer of a second of said alloys has a coarse grained microstructure which is non-superplastic.

23. The method of claim 22, wherein said first alloy is 7475 aluminum and said second alloy is 2219 aluminum.

24. The method of claim 21, wherein said alloys are each of a different material.

25. The method of claim 21, wherein said alloys are each different alloys of aluminum.

26. The method of claim 11, wherein said step of tempering comprises the steps of
solution treating;
quenching; and
aging the alloy.

27. The method of claim 1, wherein said fine grain structure includes grains having a size equal to or less than substantially ten microns.

* * * * *